(12) United States Patent
Okuda et al.

(10) Patent No.: US 7,474,026 B2
(45) Date of Patent: Jan. 6, 2009

(54) ELECTROMAGNETIC DRIVE DEVICE

(75) Inventors: Hideki Okuda, Nagoya (JP); Naohito Seko, Kariya (JP); Sanemasa Kawabata, Kariya (JP)

(73) Assignee: Denso Corporation (JP)

( * ) Notice: Subject to any disclaimer, the term of this patent is extended or adjusted under 35 U.S.C. 154(b) by 396 days.

(21) Appl. No.: 11/481,039

(22) Filed: Jul. 6, 2006

(65) Prior Publication Data

US 2007/0008056 A1    Jan. 11, 2007

(30) Foreign Application Priority Data

Jul. 6, 2005    (JP)    ............................. 2005-197118
Apr. 25, 2006    (JP)    ............................. 2006-120697

(51) Int. Cl.
H02K 5/16    (2006.01)
(52) U.S. Cl. .......................... 310/90.5; 310/14; 310/15; 251/129.15
(58) Field of Classification Search .................. 251/129.01–129.22; 310/90.5, 14, 15
See application file for complete search history.

(56) References Cited

U.S. PATENT DOCUMENTS 5,251,082 A * 10/1993 Elliott et al. ............. 360/98.07
6,806,802 B2   10/2004 Oishi et al.
7,135,798 B2 * 11/2006 Wang et al. ............. 310/90.5
2004/0227421 A1 * 11/2004 Wang et al. ............. 310/90.5
2005/0140229 A1 *  6/2005 Wang et al. ............. 310/90.5

FOREIGN PATENT DOCUMENTS

JP    2001-263524    9/2001

* cited by examiner

Primary Examiner—Gary F. Paumen
(74) Attorney, Agent, or Firm—Nixon & Vanderhye PC

(57) ABSTRACT

A moving core includes a magnetic body having a rough face-shaped wall portion at a side facing a stationary core, a plated layer portion provided on the magnetic body and including a micro concave and convex portion on the surface layer of the plated layer portion, and a lubricating layer portion provided so as to cover the plated layer portion to store lubricating particles in the concave portions of the plated layer portion. A clearance between adjacent convex portions of the micro concave and convex portion is smaller than a clearance between adjacent convex portions of concavity and convexity of the plated layer portion. The lubricating particle is larger than the clearance between the adjacent convex portions of the micro concave and convex portion and smaller than the clearance between adjacent convex portions of the plated layer portion.

10 Claims, 2 Drawing Sheets

ELECTROMAGNETIC DRIVE DEVICE

CROSS-REFERENCE TO RELATED APPLICATION

This application is based on Japanese Patent Applications No. 2005-197118 filed on Jul. 6, 2005, and No. 2006-120697 filed on Apr. 25, 2006, the disclosure of which is incorporated herein by reference in its entirety.

BACKGROUND OF THE INVENTION

1. Field of the Invention

The present invention relates to an electromagnetic drive device in which a moving part supported to a stator moves at an inner side of the stator.

2. Description of the Related Art

There is known an electromagnetic drive device which directly supports a moving part at an inner peripheral side of a stator for reduction in the number of components and simplification the structure. In such an electromagnetic drive device, a coating portion is provided in at least one of the stator and the moving part for reducing hysteresis of the moving part at the time of power supply or non-power supply to a coil (refer to JP-A-2001-263524 or JP-A-2002-222710 corresponding to U.S. Pat. No. 6,806,802). The coating portion carries out lubrication between the stator and the moving part, which move relatively to each other while contacting to each other, and secures smooth movement of the moving part.

However, in a case of forming the coating portion at the stator or the moving part, relative movement between the stator and the moving part for a long period of time causes wear of the coating portion. Further, when the coating portion disappears due to the wear development, the magnetic body of the stator or the moving part is exposed. Therefore, disappearance of the coating portion rapidly increases a friction coefficient, which invites to the wear of the stator and the moving part. Accordingly, resistance to movement of the moving part increases to increase the hysteresis of the moving part. As a result, deterioration in controllability or interruption of the movement of the moving part may be caused.

In addition, in a case of increasing the thickness of the coating portion for extending a lifetime of the coating portion, a clearance between the stator and the moving part is enlarged due to development of the wear of the coating portion. Therefore, a moving force of the moving part is lowered.

SUMMARY OF THE INVENTION

In view of the above, there exists a need for an electromagnetic drive device which overcomes the above mentioned problems in the conventional art. The present invention addresses this need in the conventional art as well as other needs, which will become apparent to those skilled in the art from this disclosure.

The present invention has an object of providing an electromagnetic drive device which stably reduces wear between a stator and a movable member (moving part) and a change in moving force of the movable member for a long period of time.

According to a first aspect of the present invention, an electromagnetic drive device includes a stator, and a movable member supported in an inner peripheral side of the stator to be movable due to magnetic adsorbing force generated between the stator and the movable member. At least one of the stator and the movable member includes a magnetic body made of a magnetic material, and a lubricating layer portion for covering an outer peripheral side of the magnetic body. The magnetic body includes an uneven wall portion provided opposite to the other one of the stator and the movable member to have concavity and convexity, and a micro concave and convex portion formed on a surface layer of the concavity and convexity of the uneven wall portion. Here, a clearance between any adjacent convex portions of the micro concave and convex portion is smaller than a clearance between adjacent convex portions of the concavity and convexity of the uneven wall portion. In contrast, the lubricating layer portion includes lubricating particles and a carrier portion for retaining the lubricating particles. In this electromagnetic drive device, the lubricating particle has an outer diameter, which is larger than the clearance between the adjacent convex portions of the micro concave and convex portion and is smaller than the clearance between the adjacent convex portions of the uneven wall portion.

Therefore, the concave portions in the uneven wall portion are filled with the lubricating layer portion containing the lubricating particles. Accordingly, even if a part of the lubricating layer portion is reduced due to wear, the lubricating particles filled in the concave portions in the uneven wall portion are re-supplied to a sliding portion between the stator and the movable member. As a result, the re-supplied lubricating particles always cause formation of a lubricating layer made of an extremely thin film in the sliding portion between the stator and the movable member. Accordingly, the wear between the stator and the movable member can be stably reduced for a long period of time. In addition, even if a part of the lubricating layer portion is reduced, the lubricating particles are re-supplied. Therefore, it is not required to increase the thickness of the lubricating layer portion. Accordingly, the moving force of the movable member can be stably maintained for a long period of time. Further, the lubricating particle is larger than the clearance between the adjacent convex portions of the micro concave and convex portion and smaller than the clearance between the adjacent convex portions of the uneven wall portion forming the concavity and convexity. Therefore, the lubricating particles are stored in the concave portions of the uneven wall portion, while not entering into the concave portions of the micro concave and convex portion. Therefore, only a carrier portion retaining the lubricating particles enters into the concave portions of the micro concave and convex portion. As a result, a contact area between the magnetic body and the lubricating layer portion increases. Accordingly, adherence between the magnetic body and the lubricating layer portion can improve.

According to a second aspect of the present invention, at least one of a stator and a movable member includes: a magnetic body including an uneven wall portion provided at a side facing the other one of the stator and the movable member to have concavity and convexity; a plated layer portion provided on the concavity and convexity of the uneven wall portion of the magnetic body to form concavity and convexity on the concavity and convexity of the uneven wall portion; a micro concave and convex portion formed on a surface layer of the concavity and convexity of the plated layer portion, a clearance between any adjacent convex portions of the micro concave and convex portion being smaller than a clearance between adjacent convex portions of the concavity and convexity of the plated layer portion; and a lubricating layer portion for covering an outer peripheral side of the plated layer portion. The lubricating layer portion includes lubricating particles and a carrier portion for retaining the lubricating particles. Furthermore, the lubricating particle has an outer diameter, which is larger than the clearance between the adjacent convex portions of the micro concave and convex portion and is smaller than the clearance between the adjacent convex portions of the plated layer portion.

Accordingly, the second aspect of the present invention has the advantages similar to the first aspect of the present invention and further, since the nonmagnetic plated layer portion is formed between the stator and the movable member, a magnetic force perpendicular to the axis can be reduced. Accordingly, the wear between the stator and the movable member can be stably reduced for a long period of time.

According to a third aspect of the present invention, at least one of a stator and a movable member includes a magnetic body including an uneven wall portion provided opposite to the other one of the stator and the movable member to have concavity and convexity, and a lubricating layer portion for covering an outer peripheral side of the magnetic body. The lubricating layer portion includes lubricating particles and a carrier portion for retaining the lubricating particles. Furthermore, the lubricating particle has an outer diameter, which is smaller than the clearance between the adjacent convex portions of the uneven wall portion, and a plurality of the lubricating particles are contained in concave portions of the uneven wall portion.

Therefore, the concave portions in the uneven wall portion are filled with the lubricating layer portion containing the lubricating particles. Accordingly, even if a part of the lubricating layer portion is reduced due to wear, the lubricating particles filled in the concave portions in the uneven wall portion are re-supplied to a sliding portion between the stator and the movable member. As a result, the re-supplied lubricating particles always cause formation of a lubricating layer made of an extremely thin film in the sliding portion between the stator and the movable member. Accordingly, the wear between the stator and the movable member can be stably reduced for a long period of time.

For example, the lubricating layer portion may include the lubricating particles which are equal to at least 40% in mass of the entire lubricating layer portion. For reducing wear of the sliding portion between the stator and the movable member, the density of the lubricating particles is preferably the higher. On the other hand, as the density of the lubricating particles becomes higher, it is more difficult to form the lubricating layer portion. Therefore, the density of the lubricating particles is set 40% in mass as the lower limit. Further, the upper limit of the density of the lubricating particles varies with a material, a shape or a size of the surface of the stator or the movable member forming the lubricating layer portion. Accordingly, the upper limit of the density of the lubricating particles may be set possibly high in such a manner as to form the lubricating layer portion.

BRIEF DESCRIPTION OF THE DRAWINGS

Other objects, features, and advantages of the present invention will become more apparent from the following detailed description made with reference to the accompanying drawings, in which like parts are designated by like reference numbers and in which.

DETAILED DESCRIPTION OF THE PREFERRED EMBODIMENTS

Figure 1:
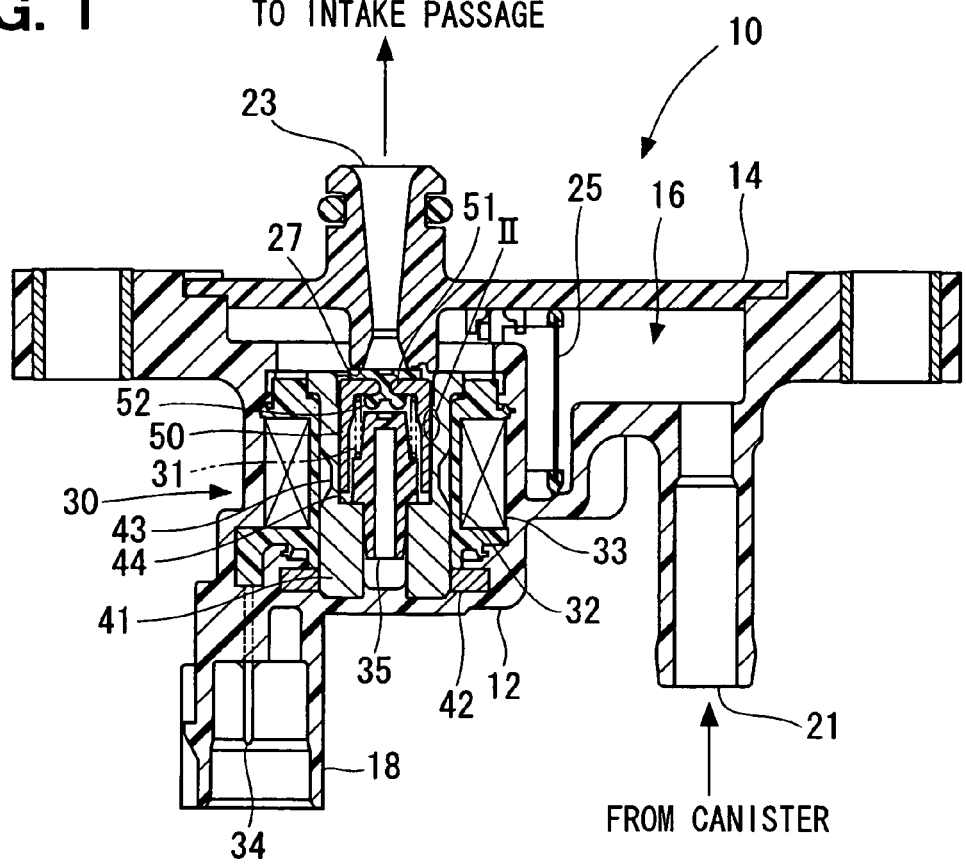
FIG. 1 is a cross sectional view showing a schematic diagram of a purge valve to which an electromagnetic drive device according to an embodiment of the present invention is applied.

An embodiment will be hereinafter explained with reference to the accompanying drawings. In this embodiment, an electromagnetic drive device is typically used for a purge valve. A purge valve 10 shown in FIG. 1 is used for an evaporative fuel treating device for treating fuel evaporated in a fuel tank (not shown), for example. The purge valve 10 is located in a purge pipe connecting a canister (not shown) to an intake passage. The purge valve 10 controls a quantity of air containing fuel vapor flowing in the purge pipe.

The purge valve 10 is provided with a body 12 and a cover 14 constituting a housing. The body 12 and the cover 14 are constructed integrally by welding, for example, and are provided with a purge passage 16 therein.

The body 12 is formed of a resin and includes an inlet port 21. The inlet port 12 is connected to a purge port of a canister (not shown). The cover 14, as similar to the body 12, is formed of a resin and includes an outlet port 23. The outlet port 23 is connected to an intake passage of an engine (not shown). Accordingly, the body 12 and the cover 14 are provided with a purge passage 16 between the inlet port 21 and the outlet port 23, so as to connect the canister to the intake passage. A filter 25 is located in the purge passage 16 formed inside the body 12 and the cover 14. The filter 25 removes foreign objects contained in air flowing into an intake pipe from the canister. The cover 14 is provided with a valve seat 27. The valve seat 27 is located at an end opposite to the intake passage of the outlet port 23 formed in the cover 14.

The purge valve 10 is equipped with an electromagnetic drive device 30. The electromagnetic drive device 30 is accommodated inside the body 12. The electromagnetic drive device 30 is provided with a coil portion, a stationary core 41 as a stator, a moving core 50 as a moving part (movable member) and a spring 31 as a resilient member. The coil portion includes a tubular bobbin 32 and a winding wire 33 wound around a peripheral side of the tubular bobbin 32. The winding wire 33 has an end connected electrically to a terminal 34. The terminal 34 is projected into a connector 18 formed in the body 12.

The stationary core 41 is formed of a magnetic material, for example, iron in a generally tubular shape. The stationary core 41 is accommodated in an inner peripheral side of the bobbin 32 of the coil portion. The stationary core 41 includes a thin portion 43 which is thinner in plate thickness in the half way in the axial direction. A yoke 42 is formed of a magnetic material, such as iron. The yoke 42 covers a radial outer side of the winding wire 33, and is connected magnetically at both axial ends to the stationary core 41. In a case shown in FIG. 1, the yoke 42 covers an outer peripheral side of the wiring wire 33 at the front and back sides in the sheet direction. Accordingly, the yoke 42 covers a part in the circumference of the outer peripheral side of the winding wire 33. However, the yoke 42 may cover sequentially in the circumference of the outer peripheral side of the winding wire 33.

The moving core 50 is formed of a magnetic material, such as iron in a generally tubular shape, coaxially with the stationary core 41. The moving core 50 includes a bottom 51 extending at an axial end in the radial inside. A seat member 52 is located in the bottom 51 and is formed of a resin, for example. The seat member 52 is seated on a valve seat 27 formed in the cover 14. When the seat member 52 is seated on the valve seat 27, the purge passage 16 between the inlet port 21 and the outlet port 23 is blocked. Accordingly, when the seat member 52 is unseated from or is seated on the valve seat 27, the purge passage 16 opens/closes.

A stopper 35 is fixed at an inside of the stationary core 41. The stopper 35 is formed of, for example, a resin or a non-magnetic material. The stopper 35 includes one of axial ends, that is, an end at a side of the seat member 52, which is provided in such a way as to be in contact with the seat member 52. Contacting the seat member 52 with the stopper 35 restricts the moving core 50 integral with the seat member 52 to move toward the stopper 35.

The spring 31 includes one of axial ends which contacts the bottom 51 of the moving core 50, and the other which contacts the stopper 35. The spring 31 has extensible force in the axial direction, which causes the moving core 50 to be pushed in the direction of the valve seat 27. When the power is not supplied to the coil portion, the moving core 50 is biased in the direction of the valve seat 27 by biasing force of the spring 31, so that the seat member 52 is seated on the valve seat 27.

The moving core 50 is accommodated in an inner peripheral side of the stationary core 41. Therefore, the moving core 50 moves in the axial direction while supported directly by the stationary core 41. The stationary core 41 includes a thinner portion 43 in the axial halfway thereof. Therefore, at the time of supplying power to the coil portion, the magnetic flux flowing in the stationary core 41 is saturated at the thinner portion 43. On the other hand, since the moving core 50 is located in the inner peripheral side of the thinner portion 43, the magnetic flux saturated at the thinner portion 43 of the stationary core 41 is leaked from the stationary core 41 to the moving core 50 and then, flows through the moving core 50 to the stationary core 41. At this point, the magnetic flux flown into the moving core 50 flows to a thicker adsorbing portion 44 positioned at an opposite side to the valve seat 27 of the thinner portion 43 of the stationary core 41. As a result, at the time of supplying power to the coil portion, magnetic adsorbing force for adsorbing the moving core 50 and the stationary core 41 is produced between the moving core 50 and the stationary core 41. When the magnetic adsorbing force produced between the moving core 50 and the stationary core 41 is larger than the biasing force of the spring 31, the moving core 50 moves to the side of the adsorbing portion 44 of the stationary core 41.

Figure 2:
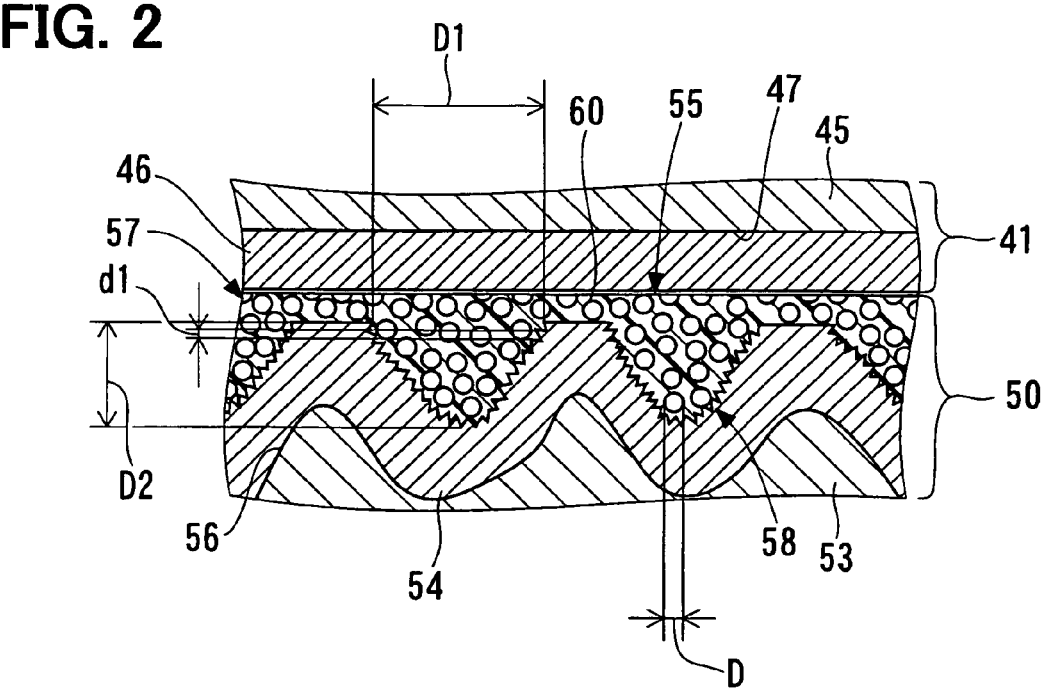
FIG. 2 is an enlarged view of the part 11 in FIG. 1.

The moving core 50, as shown in FIG. 2, includes a magnetic body 53, a plated layer portion 54 and a lubricating layer portion 55. The plated layer portion 54 and the lubricating layer portion 55 are formed at a side of the stationary core 41 of the magnetic body 53, that is, an outer peripheral side of the magnetic body 53. The moving core 50 includes an outer diameter generally equal to or slightly smaller than an inner diameter of the stationary core 41. Therefore, the moving core 50 is guided by an inner wall of the stationary core 41 to move in the axial direction in an inner peripheral side of the stationary core 41. As a result, the moving core 50 and the stationary core 41 slide each other.

The moving core 50 is provided with a rough face-shaped wall portion 56 of the magnetic body 53 at a side facing the stationary core 41. Accordingly, the magnetic body 53 includes a peripheral wall opposite to the inner wall of the stationary core 41, and the peripheral wall is formed in a rough face shape in such a way as to provide irregular concavity and convexity. The rough face-shaped wall portion 56 of the magnetic body 53 can be formed by any method, such as shot process. The rough face-shaped wall portion 56 of the magnetic body 53 is covered with a plated layer portion 54. The plated layer portion 54 is formed of electroless hard plating such as nickel lean plating. Forming the plated layer portion 54 with electroless plating allows the plated layer portion 54 to be formed along the rough face-shaped portion 56 of the magnetic body 53 having the concavity and convexity. Accordingly, the plated layer portion 54 can be formed while reflecting the concavity and convexity shape of the rough face-shaped wall portion 56 of the magnetic body 53.

The plated layer portion 54 is further covered with a lubricating layer portion 55. Accordingly, the plated layer portion 54 and the lubricating layer portion 55 are stacked in order on the outer peripheral side of the rough face-shaped wall portion 56 of the magnetic body 53 in the moving core 50. The lubricating layer portion 55 is formed of lubricating particles 57 and a carrier portion 60 made of a resin and retaining the lubricating particles 57. The lubricating particle 57 may be made of a solid lubricating substance such as a particle formed of fluorinated resin such as polytetrafluoro-ethylene or a particle formed of metallic compound such as molybdenum sulfide.

The lubricating layer portion 55 may use solid or semisolid resin or fat as the carrier portion 60 retaining the lubricating particles 57. In a case of using the solid carrier portion 60, the lubricating layer portion 55 is formed as a solid film on the plated layer portion 54 of the magnetic body 53. On the other hand, in a case of using the semisolid carrier portion 60, the lubricating layer portion 55 is formed as a fluid film on the plated layer portion 54 of the magnetic body 53. The solid carrier 60 may use resin such as polyamide, and the semisolid carrier 60 may use fat such as grease.

After the plated layer portion 54 is formed on the magnetic body 53, a micro concave and convex portion 58 is formed in the surface layer of the plated layer portion 54. The micro concave and convex portion 58 formed in the plated layer portion 54 has a clearance between adjacent convex portions, which is smaller in relation to a clearance between adjacent convex portions of the concavity and convexity of the plated layer portion 54. That is, the magnetic body 53 is formed with the rough face-shaped wall portion 56 having a large clearance between adjacent convex portions. Therefore, the plated layer portion 54 having a large clearance between adjacent convex portions, i.e., a large cycle of the concavity and convexity is formed on the rough face-shaped wall portion 56. Further, in the surface layer of the plated layer portion 54, the micro concave and convex portion 58 having a small clearance between adjacent convex portions, i.e., a small cycle of the concavity and convexity is formed. The micro concave and convex portion 58 is formed in the surface layer of the plated layer portion 54, to face the lubricating layer portion 55 and therefore, adherence of the lubricating layer portion 55 to the plated layer portion 54 improves. That is, forming the micro concave and convex portion 58 on the surface of the plated layer portion 54 causes an increase in contact surface area between the plated layer portion 54 and the lubricating layer portion 55, thereby increasing adherence between the plated layer portion 54 and the lubricating layer portion 55. The irregular micro concave and convex portion 58 on the plated layer portion 54 may be formed by any method such as shot process.

As shown in FIG. 2, an outer diameter D of the lubricating particle 57 contained in the lubricating layer portion 55 is larger than the clearance dl between adjacent convex portions of the micro concave and convex portion 58 and is smaller than the clearance D1 between the one convex portion and the other convex portion of the concavity and convexity of the plated layer portion 54 provided on the wall portion 56. In addition, the outer diameter D of the lubricating particle 57 is smaller than the depth D2 of the concavity and convexity of the plated layer portion 54 provided on the wall portion 56. Therefore, the lubricating particles 57 are filled in the large concave portions of the plated layer portion 54 formed on the wall portion 56 of the magnetic body 53, but do not enter into the small concave portions of the micro concave and convex portion 58 formed in the surface layer of the plated layer portion 54. Accordingly, when the plated layer portion 54 is covered with the lubricating layer portion 55, the lubricating particles 57 of the lubricating layer portion 55 are stored in the large concave portions of the plated layer portion 54. On the other hand, the lubricating particle 57 does not enter into the small concave portion of the micro concave and convex portion 58. Therefore, the small concave portion of the micro concave and convex portion 58 is filled only with the carrier portion 60 out of the lubricating layer portion 55. As a result, the carrier portion 60 and the plated layer portion 54 adhere in the micro concave and convex portion 58 without interruption of the lubricating particles 57, thereby improving adherence between the plated layer portion 54 and the lubricating layer portion 55.

The lubricating layer portion 55 contains the lubricating particles which are equal to 40% in mass or more of the entire lubricating layer portion 55. As the density of the lubricating particles 57 contained in the lubricating layer portion 55 increases, the wear between the stationary core 41 and the moving core 50 is further reduced. Therefore, it is preferable that the density of the lubricating particles contained in the lubricating layer portion 55 is higher. Therefore, the density of the lubricating particles is set 40% in mass as the lower limit. On the other hand, when the density of the lubricating particles 57 increases, a ratio of the lubricating particles to the carrier portion increases, thereby making it difficult to form a stable lubricating layer portion 55. In addition, the upper limit to the density of the lubricating particles 57 varies with a material, a shape or a size of the stationary core 41 or the moving core 50 provided with the lubricating layer portion 55. Accordingly, the upper limit to the density of the lubricating particles 57 may be set as high as possible within the extent the lubricating layer portion 55 is formed.

In the embodiment, the stationary core 41 includes a magnetic body 45 and a plated layer portion 46. The stationary core 41 includes the plated layer portion 46 in an inner peripheral side of the magnetic body 45. The magnetic body 45 has a flat wall portion 47. Therefore, the plated layer portion 46 is formed flatly corresponding to the flat wall portion 47 of the magnetic body 45. The plated layer portion 46 is formed by nonmagnetic electroless plating such as nickel lean plating in the same way as in the moving core 50.

The lubricating layer portion 55 of the moving core 50 covers the magnetic body 53 and the plated layer portion 54 at an outer peripheral side thereof, that is, at a side facing the stationary core 41. Therefore, at an initial period of time for sliding between the stationary core 41 and the moving core 50, the lubricating layer portion 55 of the moving core 50 slides on the plated layer portion 46 of the stationary core 41. This allows a sliding resistance between the stationary core 41 and the moving core 50 to be a relatively small. As the stationary core 41 and the moving core 50 continue to slide, the lubricating layer portion 55 is worn away. In the embodiment, when the lubricating layer portion 55 is worn away caused by the sliding of the moving core 50 on the stationary core 41, the lubricating particles 57 contained in the lubricating layer portion 55 and stored in the large concave portions of the plated layer portion 54 of the wall portion 56 are supplied into a sliding portion between the stationary core 41 and the moving core 50. That is, when the moving core 50 slides on the stationary core 41, the lubricating particles 57 stored in the large concave portions of the plated layer portion 54 enter into the sliding portion between the stationary core 41 and the moving core 50 due to friction force. Therefore, the thin film state continues in all the time formed with the lubricating particles 57 in the sliding portion between the stationary core 41 and the moving core 50. As a result, the wear of the magnetic body 45 and the plated layer portion 46 in the stationary core 41 and the wear of the magnetic body 53 and the plated layer portion 54 of the moving core 50 are effectively reduced.

Figure 3:
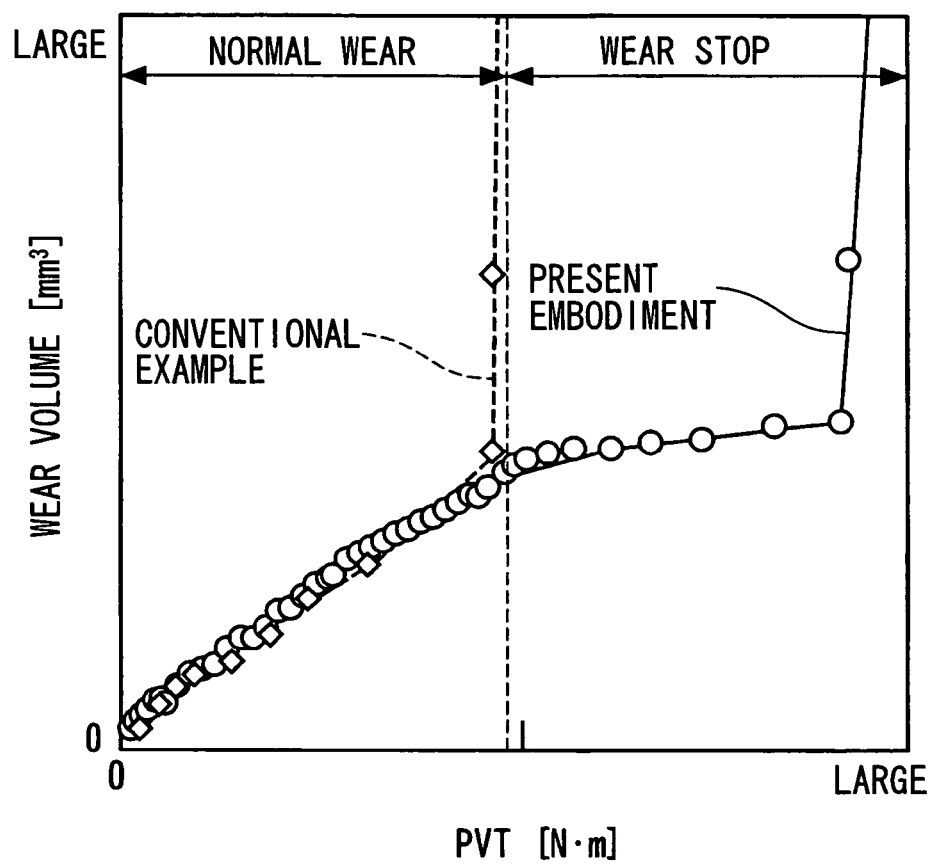
FIG. 3 is a pattern diagram showing a wear volume relative to a product of force applied between a stationary core and a moving core and a moving distance of the moving core.

FIG. 3 shows a wear volume in relation to a product of force applied to the sliding portion and a moving distance between the stationary core 41 and the moving core 50. That is, FIG. 3 has a lateral axis which can be assumed as a lifetime (PVT) for each of the stationary core 41 and the moving core 50 and a vertical axis which can be assumed as a wear amount for each of the stationary core 41 and the moving core 50. In this case, as compared to a conventional electromagnetic drive device (conventional example) where a lubricating layer portion is formed on a flat surface of the magnetic body in the moving core, a lifetime of the electromagnetic drive device 30 according to the embodiment doubles. In this embodiment, even if the lubricating layer portion 55 is worn away by the repeated sliding between the stationary core 41 and the moving core 50, the lubricating particles 57 are supplied from the concave portions of the plated layer portion 54 formed corresponding to the rough face-shaped wall portion 56 having concavity and convexity.

At an initial period of time for the sliding between the stationary core 41 and the moving core 50, the wear of the lubricating layer portion 55 is developed regularly in each case of the electromagnetic drive device 30 in the embodiment and the conventional electromagnetic drive device. In the conventional electromagnetic drive device, when the regular wear of the lubricating layer portion is developed and thereby the lubricating layer portion disappears, the magnetic body is exposed. Therefore, the wear of the magnetic body is rapidly developed after the regular wear of the lubricating layer portion. On the other hand, in the embodiment, when the regular wear of the lubricating layer portion is developed and thereby a part of the plated layer portion 54 on the magnetic body 53, i.e., the convex portions of the plated layer portion 54 are exposed, the lubricating particles 57 are supplied from the concave portions of the wall portion 56 with the plated layer portion. Therefore, the lubricating film is formed by the supplied lubricating particles 57 between the exposed plated layer portion on the magnetic body 53 in the moving core 50 and the stationary core 41. As a result, in the electromagnetic drive device 30 in the embodiment, even after the regular wear is developed, the development of the wear stays for a certain period of time. Accordingly, the electromagnetic drive device 30 in the embodiment can extend the lifetime of each for the stationary core 41 and the moving core 50.

Next, operations of the purge valve 10 having the above-described structure of the electromagnetic drive device will be explained.

When the power is not supplied to the winding wire 33 of the coil portion, the moving core 50 moves toward the valve seat 27 by biasing force of the spring 31. This causes the seat member 52 located at the moving core 50 to be seated on the valve seat 27. Therefore, when the power is not supplied to the coil portion, the purge passage 16 connecting the inlet port 21 to the outlet port 23 is shut.

When the power is supplied to the coil portion from an external ECU (not shown), the magnetic field is produced. Therefore, a magnetic circuit is formed in the yoke 42, the stationary core 41 and the moving core 50 surrounding the winding wire 33 of the coil portion due to the produced magnetic field and the magnetic flux flows therein. Then, the magnetic flux is saturated in the thin portion 43 of the stationary core 41 as described above, and therefore the magnetic flux leaked from the stationary core 41 flows through the moving core 50 to the adsorbing portion 44 of the stationary core 41. Therefore, the magnetic adsorbing force is produced between the adsorbing portion 44 of the stationary portion 41 and the moving core 50. When the magnetic adsorbing force between the stationary core 41 and the moving core 50 is greater than the biasing force of the spring 31, the moving core 50 moves toward the adsorbing portion 44 of the stationary core 41. The moving core 50 moves until the seat member 52 contacts the stopper 35.

When the moving core 50 moves toward the adsorbing portion 44, the seat member 52 located in the moving core 50 is unseated from the valve seat 27. Therefore, the purge passage 16 connecting the inlet port 21 to the outlet port 23 is opened. Accordingly, the air flowing from the canister to inlet port 21 is discharged through the purge passage 16 from the outlet port 23 to the intake passage.

When the power supply to the coil portion is stopped, the magnetic adsorbing force between the stationary core 41 and the moving core 50 disappears. Therefore, the moving core 50 moves to a side opposite to the adsorbing portion 44 by the biasing force of the spring 31. As a result, the seat member 52 located in the moving core 50 is seated on the valve seat 27 and the purge passage 16 is again blocked.

As described above, in the electromagnetic drive device 30 of the purge valve 10 according to the embodiment, even when the lubricating layer portion 55 of the moving core 50 is worn away caused by the sliding between the stationary core 41 and the moving core 50, the lubricating particles 57 are supplied in the sliding portion between the stationary core 41 and the moving core 50. Therefore, the wear of each of the magnetic body 53 and the plated layer portion 54 in the moving core 50 is reduced. Accordingly, the lifetime of each of the stationary core 41 and the moving core 50 can be extended. In addition, it is not required to enlarge the thickness of the lubricating layer portion 55 in consideration of wear. Accordingly, the clearance to be formed between the stationary core 41 and the moving core 50 is reduced, thus stably maintaining thrust of the moving core 50 for a long period of time.

Further, in the electromagnetic drive device 30 of the purge valve 10 according to the embodiment, each of the lubricating particles 57 contained in the lubricating layer portion 55 has the outer diameter D, which is set smaller than the clearance D1 between adjacent convex portions of the plated layer portion 54 formed on the rough face-shaped wall portion 56 to correspond to the shape of the rough face-shaped wall portion 56. Therefore, the lubricating particles 57 are sufficiently stored in the concave portions of the plated layer portion 54. Accordingly, even if the lubricating layer portion 55 is worn away, the lubricating particles 57 are re-supplied in the sliding portion. In addition, each of the lubricating particles 57 contained in the lubricating layer portion 55 has the outer diameter D, which is set larger than the clearance dl between adjacent convex portions of the micro concave and convex portion 58. Therefore, the lubricating particle 57 does not enter into the concave portion of the micro concave and convex portion 58 provided on the surface layer of the magnetic body 53. As a result, the micro concave and convex portion 58 of the plated layer portion 54 provided on the wall portion 56 directly contacts the carrier portion 60 of the lubricating layer portion 55 and the contact is not interrupted by the lubricating particles. Accordingly, adherence of the plated layer portion 54 to the lubricating layer portion 55 improves.

Other Embodiments

Although the present invention has been fully described in connection with the embodiment thereof with reference to the accompanying drawings, it is to be noted that various changes and modifications will become apparent to those skilled in the art.

For example, in the above-described embodiment of the present invention, there is explained an example where the lubricating layer portion 55 is formed only in the moving core 50. However, a lubricating layer portion may be formed in the stationary core 41. For example, a rough face-shaped wall portion can be formed in an inner peripheral side of the stationary core 41 facing the moving core 50 and further, a plated layer portion and a lubrication layer portion can be formed on the rough face-shaped wall portion of the stationary core 41. Further, lubrication layer portions may be formed both in the stationary core 41 and the moving core 50. In this case, the lubricating particles are supplied to the sliding portion from not only the moving core 50 but also the stationary core 41. Accordingly, the wear of each for the stationary core 41 and the moving core 50 can be further reduced.

In the above-described embodiment, there is explained an example where the plated layer portion 54 is formed between the magnetic body 53 of the moving core 50 and the lubricating layer portion 55. However, the plated layer portion 54 between the magnetic body 53 of the moving core 50 and the lubricating layer portion 55 may be omitted. In this case, a micro concave and convex portion is formed in the rough face-shaped wall portion 56 of the magnetic body 53. In addition, the plated layer portion may be omitted in a case of forming the lubricating layer portion in the stationary core 41 in the same way as in the moving core 50.

In the above-described embodiment, the micro concave and convex portion 58 are provided on the surface layer of the plated layer portion 54 provided on the rough face-shaped wall portion 56. However, the micro concave and convex portion 58 may be not provided on the surface layer of the plated layer portion 54 when the adhesion force between the plated layer portion 54 and the lubricating layer portion 55 is sufficiently larger.

Further, in the embodiment of the present invention as described above, there is explained an example where the electromagnetic drive device 30 is applied to the purge valve 10. However, for example, the electromagnetic drive device 30 of the present invention can be applied to an apparatus equipped with an electromagnetic drive portion of a spool valve for adjusting hydraulic pressure or another driven member driven by the moving core 50.

While only the selected preferred embodiments have been chosen to illustrate the present invention, it will be apparent to those skilled in the art from this disclosure that various changes and modifications can be made therein without departing from the scope of the invention as defined in the appended claims. Furthermore, the foregoing description of the preferred embodiments according to the present invention is provided for illustration only, and not for the purpose of limiting the invention as defined by the appended claims and their equivalents.

What is claimed is:

1. An electromagnetic drive device comprising:
a stator; and a movable member supported in an inner peripheral side of the stator, the movable member being movable due to magnetic adsorbing force generated between the stator and the movable member, at least one of the stator and the movable member comprising:

a magnetic body made of a magnetic material, the magnetic body including an uneven wall portion provided opposite to the other one of the stator and the movable member to have concavity and convexity, and a micro concave and convex portion formed on a surface layer of the concavity and convexity of the uneven wall portion, a clearance between any adjacent convex portions of the micro concave and convex portion being smaller than a clearance between adjacent convex portions of the concavity and convexity of the uneven wall portion; and a lubricating layer portion for covering an outer peripheral side of the magnetic body, the lubricating layer portion including lubricating particles and a carrier portion for retaining the lubricating particles, wherein the lubricating particle has an outer diameter, which is larger than the clearance between the adjacent convex portions of the micro concave and convex portion and is smaller than the clearance between the adjacent convex portions of the uneven wall portion.

2. The electromagnetic drive device according to claim 1, wherein:

the stator has a tubular shape; and the movable member is movable in an axial direction due to magnetic adsorbing force generated between the stator and the movable member when power is supplied to a coil.

3. The electromagnetic drive device according to claim 1, wherein the lubricating layer portion contains the lubricating particles which are equal to at least 40% in mass of the lubricating layer portion.

4. An electromagnetic drive device comprising:

a stator; and a movable member supported in an inner peripheral side of the stator, the movable member being movable due to magnetic adsorbing force generated between the stator and the movable member, at least one of the stator and the movable member comprising:

a magnetic body made of a magnetic material, the magnetic body including an uneven wall portion provided at a side facing the other one of the stator and the movable member to have concavity and convexity; and a plated layer portion provided on the concavity and convexity of the uneven wall portion of the magnetic body to form concavity and convexity on the concavity and convexity of the uneven wall portion;

a micro concave and convex portion formed on a surface layer of the concavity and convexity of the plated layer portion, a clearance between any adjacent convex portions of the micro concave and convex portion being smaller than a clearance between adjacent convex portions of the concavity and convexity of the plated layer portion; and a lubricating layer portion for covering an outer peripheral side of the plated layer portion, the lubricating layer portion including lubricating particles and a carrier portion for retaining the lubricating particles, wherein the lubricating particle has an outer diameter, which is larger than the clearance between the adjacent convex portions of the micro concave and convex portion and is smaller than the clearance between the adjacent convex portions of the plated layer portion.

5. The electromagnetic drive device according to claim 4, wherein the lubricating layer portion contains the lubricating particles which are equal to at least 40% in mass of the lubricating layer portion.

6. The electromagnetic drive device according to claim 4, wherein the concavity and convexity of the plated layer portion has an irregular wave shape on the surface layer.

7. An electromagnetic drive device comprising:

a stator; and a movable member supported in an inner peripheral side of the stator, the movable member being movable due to magnetic adsorbing force generated between the stator and the movable member, at least one of the stator and the movable member comprising:

a magnetic body made of a magnetic material, the magnetic body including an uneven wall portion provided opposite to the other one of the stator and the movable member to have concavity and convexity; and a lubricating layer portion for covering an outer peripheral side of the magnetic body, the lubricating layer portion including lubricating particles and a carrier portion for retaining the lubricating particles, wherein:

the lubricating particle has an outer diameter, which is smaller than the clearance between the adjacent convex portions of the uneven wall portion; and a plurality of the lubricating particles are contained in concave portions of the uneven wall portion.

8. The electromagnetic drive device according to claim 7, further comprising a micro concave and convex portion formed on a surface layer of the concavity and convexity of the uneven wall portion, wherein a clearance between any adjacent convex portions of the micro concave and convex portion is smaller than a clearance between the adjacent convex portions of the concavity and convexity of the uneven wall portion, and is smaller than an outer diameter of the lubricating particle.

9. The electromagnetic drive device according to claim 7, further comprising:

a plated layer portion provided to cover the uneven wall portion of the magnetic body to form concavity and convexity on the concavity and convexity of the uneven wall portion; and a micro concave and convex portion formed on a surface layer of the concavity and convexity of the plated layer portion, wherein a clearance between any adjacent convex portions of the micro concave and convex portion is smaller than a clearance between adjacent convex portions of the concavity and convexity of the plated layer portion, and is smaller than an outer diameter of the lubricating particle.

10. The electromagnetic drive device according to claim 7, wherein the lubricating layer portion contains the lubricating particles which are equal to at least 40% in mass of the lubricating layer portion.

* * * * *